United States Patent [19]

Kaneko et al.

[11] Patent Number: 5,554,303

[45] Date of Patent: Sep. 10, 1996

[54] MAGNETIC RECORDING MEDIUM PREPARATION

[75] Inventors: Hideo Kaneko; Katsushi Tokunaga; Yoshio Tawara, all of Kanagawa-ken; Noboru Tamai; Yasuaki Nakazato, both of Nagano-ken, all of Japan

[73] Assignee: Shin-Etsu Chemical Co., Ltd., Tokyo, Japan

[21] Appl. No.: 397,564

[22] Filed: Mar. 2, 1995

[30]    Foreign Application Priority Data

Mar. 4, 1994 [JP] Japan .................................. 6-034595
Mar. 28, 1994 [JP] Japan .................................. 6-057076

[51] Int. Cl.$^6$ .............................. B44C 1/22; H01L 21/00
[52] U.S. Cl. .................................. 216/2; 216/11; 216/22; 216/79; 216/99; 252/79.5; 156/643.1; 156/662.1
[58] Field of Search ..................... 216/2, 11, 22, 216/34, 67, 79, 99; 156/643.1, 646.1, 662.1; 252/79.1, 79.5; 427/127, 129, 130, 131, 132, 309

[56]              References Cited

U.S. PATENT DOCUMENTS 4,985,306  1/1991  Morizane et al. .
5,166,006 11/1992  Lal et al. .
5,353,182 10/1994  Nakamura et al. .................. 216/22 X

FOREIGN PATENT DOCUMENTS 574835  12/1993  European Pat. Off. .

Primary Examiner—William Powell
Attorney, Agent, or Firm—Wenderoth, Lind & Ponack

[57]                ABSTRACT

An improvement is proposed in the method for the preparation of a magnetic recording medium by forming a magnetic recording layer of a magnetic alloy on the surface of a non-magnetic substrate plate of, e.g., silicon so as to impart the magnetic recording medium with improved CSS (contact-start-stop) characteristics still without affecting the magnetic recording density. The improvement can be obtained by subjecting the surface of the substrate plate, prior to the formation of the magnetic recording layer, to a surface-roughening treatment which is performed either by a dry-process such as plasma etching and reactive ion etching or by a wet-process of anisotropic etching by using an aqueous solution of sodium or potassium hydroxide as the anisotropic etching solution. In particular, the plasma etching or reactive ion etching is conducted in the presence of a particulate scattering source body of aluminum, etc. placed in the vicinity of the CSS zone so that the surface-roughening effect is limited to the CSS zone by the deposition of particulates scattered therefrom leaving the recording zone unroughened not to decrease the recording density.

9 Claims, 4 Drawing Sheets

PERIPHERAL DISTANCE

PERIPHERAL DISTANCE

PERIPHERAL DISTANCE

MAGNETIC RECORDING MEDIUM PREPARATION

BACKGROUND OF THE INVENTION

The present invention relates to an improvement in a magnetic recording medium or, more particularly, to an improvement in a magnetic recording medium of the type consisting of a silicon-based non-magnetic substrate plate and a magnetic recording layer of a magnetic alloy formed thereon by sputtering or other dry process and having usefulness as an information signal-recording medium in electronic data processing.

While magnetic recording media of the above mentioned type play a core role as an external memory device in computers, they are required to have a recording capacity and recording density increasing year by year and extensive investigations therefor are now under way throughout the world in order to obtain a still higher recording density. As is known, the recording density is not determined by the characteristics of the recording medium alone but a factor having influences on the recording density of a magnetic recording medium is the so-called flying height of the magnetic head, i.e. the distance between the surface of the magnetic recording medium and the magnetic head for writing the signals of information in and reading the recorded signals out of the magnetic recording medium as held above the surface of the rotating magnetic recording medium with a very narrow gap. Namely, the recording density in a system of a magnetic recording device consisting of a magnetic recording medium and a magnetic head is increased by decreasing the flying height of the magnetic head. As is readily understood, the flying height of the magnetic head cannot be decreased without increasing the flatness and/or smoothness of the surface of the recording medium which in turn is mostly determined by the flatness and smoothness of the substrate plate on which the magnetic recording layer is formed to complete a magnetic recording medium.

Along with the trend in the modern computer technology toward more and more compact computers such as the so-called note-book-type and palm top-type computers, the magnetic recording device is also required to have a thickness as small as possible so that the magnetic recording medium is also required to have a decreased thickness. Since the principal fraction of the thickness of a magnetic recording medium is occupied by the thickness of the non-magnetic substrate plate, an important problem therefor is to develop a substrate plate which is highly resistant against distortion or deformation by an external force even when the thickness thereof is greatly decreased to comply with the above mentioned requirement.

The most conventional material of the substrate plate of a magnetic recording medium in the prior art is an aluminum alloy and it is usual that a substrate plate of an aluminum alloy is provided with an undercoating layer of a nickel-phosphorus alloy. Since aluminum alloys in general are soft as a metallic material, it is a difficult matter to obtain full flatness and smoothness of the surface of a substrate plate by grinding and distortion or warping sometimes occurs in a substrate plate of an aluminum alloy during mechanical working, especially, when the thickness of the substrate plate is small. In this regard, non-magnetic materials having a larger hardness than aluminum alloys have been proposed and practically under use as an alternative material of aluminum alloys including glass, ceramics and single crystal silicon wafers used in the manufacture of semiconductor devices (see, for example, Japanese Patent Publication No. 2-41089 and Japanese Patent Kokai No. 57-105826), of which silicon is preferred.

As to the relative positions of a magnetic recording medium and a magnetic head in a magnetic recording device, on the other hand, it is usual that, when the magnetic recording medium is rotating, the magnetic head is not in direct contact with the surface of the magnetic recording medium but is floating above the surface by means of the lift due to the air flow caused by the rotation of the medium by keeping a so-called flying height therebetween but, when the magnetic recording medium is stationary, the magnetic head rests on the magnetic recording medium in direct contact therewith. This mode of the relationship between the magnetic recording medium and the magnetic head is referred to as the CSS (contact-start-stop) mode and the area of the surface of the recording medium on which the magnetic head rests when in stationary state is called the CSS zone, which is usually near to the inner periphery of the magnetic recording medium in an annular form. The requirement for flatness and smoothness of the magnetic recording medium cannot be free from the problem inherent in the above mentioned CSS mode of the magnetic recording device because, when the surface of the magnetic recording medium is too flat and smooth, a resistive force like attraction called stiction is generated against starting of the magnetic recording medium into rotation from the stationary state to greatly affect the so-called CSS characteristic of the system. This situation just counteracts against the requirement for the increased recording density by increasing the flatness and smoothness of the surface of the magnetic recording medium.

In this connection, proposals have been made in Japanese Patent Kokai No. 5-258293, No. 5-205258, No. 5-166176, N5-151562 and No. 5-094617 for a method of texturing of the substrate surface, for example, by gently rubbing the substrate surface with an abrasive tape in one or more specified directions to form ruggedness on the surface (see Japanese Patent Kokai No. 4-259908). This method is based on the fact that the attractive force or stiction between the magnetic head and the magnetic recording medium against starting is proportional to the true contacting area between the magnetic head and the magnetic recording medium so that it is expected that the true contacting area can be decreased by texturing or roughening of the substrate surface. No quite satisfactory results have been obtained, however, by these methods because it is an extremely difficult matter to obtain a good balance between the incompatible requirement for the increased recording density and the requirement for the improvement of the CSS characteristic if not to mention the disadvantage in this abrasive method that deep scratches are sometimes formed in the substrate plate to greatly decrease the mechanical strengths thereof.

Japanese Patent Publication No. 2-59523 discloses a method for the texturing or surface roughening applicable exclusively to a substrate plate of silicon in which protrusions of an abrasive material are provided to protrude on the substrate surface but this method is unpractically complicated involving the steps of doping of the silicon surface with boron, formation of an aluminum layer thereon, annealing and so on. In addition, the height of the protrusions cannot be well controlled so that the height sometimes reaches 1 µm or even larger to exceed the thickness of the magnetic recording layer to be formed thereon so that the flying height of the magnetic head cannot be small enough.

SUMMARY OF THE INVENTION

The present invention accordingly has an object to provide an improvement, in the method for the preparation of a magnetic recording medium comprising a non-magnetic substrate plate which is usually in the form of an annular disc and a magnetic recording layer of a magnetic alloy formed on the substrate surface, by which a magnetic recording medium having an increased recording density and still exhibiting good CSS characteristic can be obtained.

Thus, the present invention provides an improvement, in the method for the preparation of a magnetic recording medium comprising a substrate plate of silicon as a non-magnetic material and a magnetic recording layer of a magnetic metal or alloy formed on at least one surface of the substrate plate in a process comprising the step of forming the magnetic recording layer by a dry process on the surface of the substrate plate, which improvement comprises, prior to the formation of the magnetic recording layer on the surface of the substrate plate, subjecting the surface of the substrate plate to a surface roughening treatment so that the surface has a surface roughness Rmax in the range from 5 nm to 100 nm.

The above mentioned surface roughening treatment can be performed either by a dry-process etching method such as plasma etching and reactive ion etching or a wet-process etching method by using an anisotropic etching solution which is typically an aqueous solution of sodium hydroxide or potassium hydroxide.

DETAILED DESCRIPTION OF THE PREFERRED EMBODIMENTS

As is described above, the improvement as the object of the present invention can be achieved by subjecting the surface of a substrate plate of silicon to a surface roughening treatment to give a specific surface roughness prior to the formation of a magnetic recording layer on the substrate surface in the manufacturing process of a magnetic recording medium.

Though not particularly limitative, the improvement obtained according to the present invention is more remarkable when the substrate plate is made from silicon. The term of a "silicon-made substrate plate" means that at least the surface layer of the substrate plate is made from silicon so that a substrate plate of polycrystalline silicon and that taken from a semiconductor-grade silicon wafer can be used in the invention. The thickness of the silicon substrate is not particularly limitative and can be conventional as a substrate plate of magnetic recording media, for example, in the range from 0.2 mm to 1.5 mm or, preferably, from 0.3 mm to 0.7 mm. The substrate plate usually has an annular form having a diameter required for the respective memory instruments. When a single-crystal silicon wafer is used as the material, a wafer having a diameter as large as 150 mm or even larger can readily be obtained as a commercial product.

According to the invention, the surface of the silicon substrate plate described above is conditioned by a surface roughening treatment prior to the formation of the magnetic recording layer thereon. The surface roughening treatment in the invention is performed either by a dry-process such as plasma etching and reactive ion etching or a wet-process such as anisotropic etching by using an anisotropic etching solution.

Figure 3:
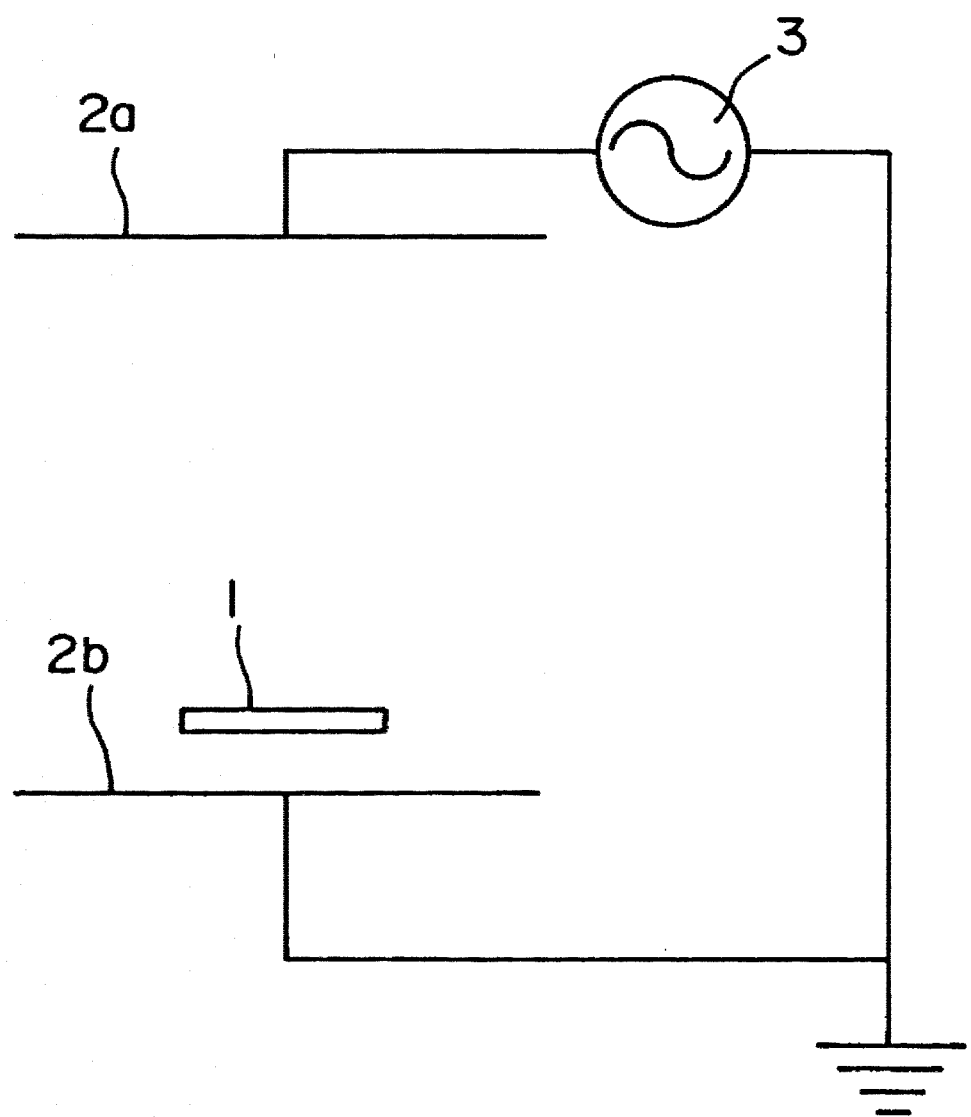
FIG. 3 is a schematic illustration of the arrangement of a substrate plate which is disposed in parallel to the electrode surface in an apparatus for plasma etching.

FIG. 3 schematically illustrates the wiring circuit diagram in a plasma etching chamber comprising a pair of oppositely facing electrodes 2b, 2a, one, directly grounded and, the other, grounded through a high-frequency electric power source 3. The silicon substrate 1 is placed between the electrodes 2a, 2b or in the vicinity of the lower electrode 2b, for example, in parallel to the electrode 2b. When an electric power of radio frequency or microwave frequency is applied between the electrodes 2a, 2b under an adequately controlled conditions of the gaseous atmosphere, plasma is generated between the electrodes 2a, 2b by which the surfaces of the silicon substrate plate are etched to be imparted with an appropriate surface roughness.

Figure 1:
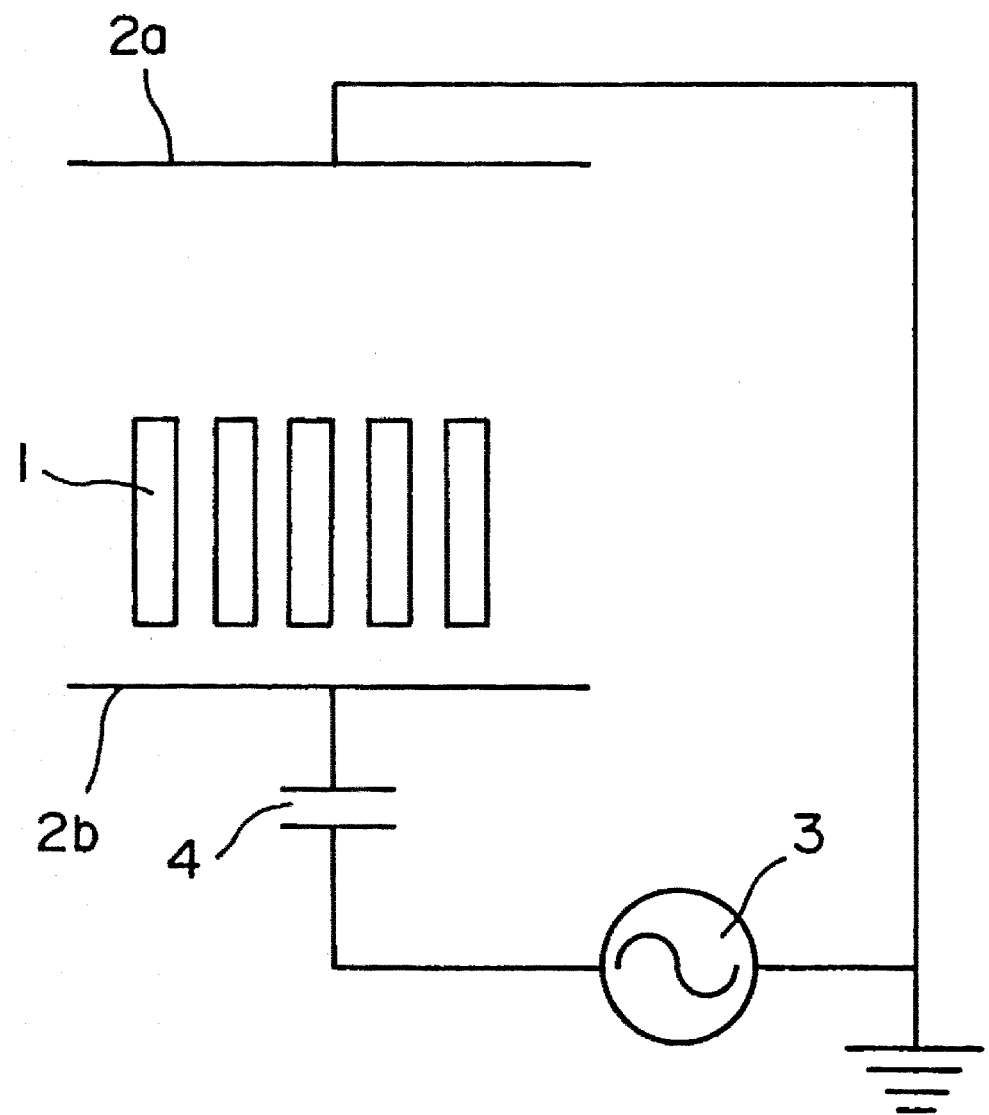
FIG. 1 is a schematic illustration of the arrangement of a plural number of substrate plates which are disposed perpendicularly to the electrode surface in an apparatus for reactive ion etching.
Figure 2:
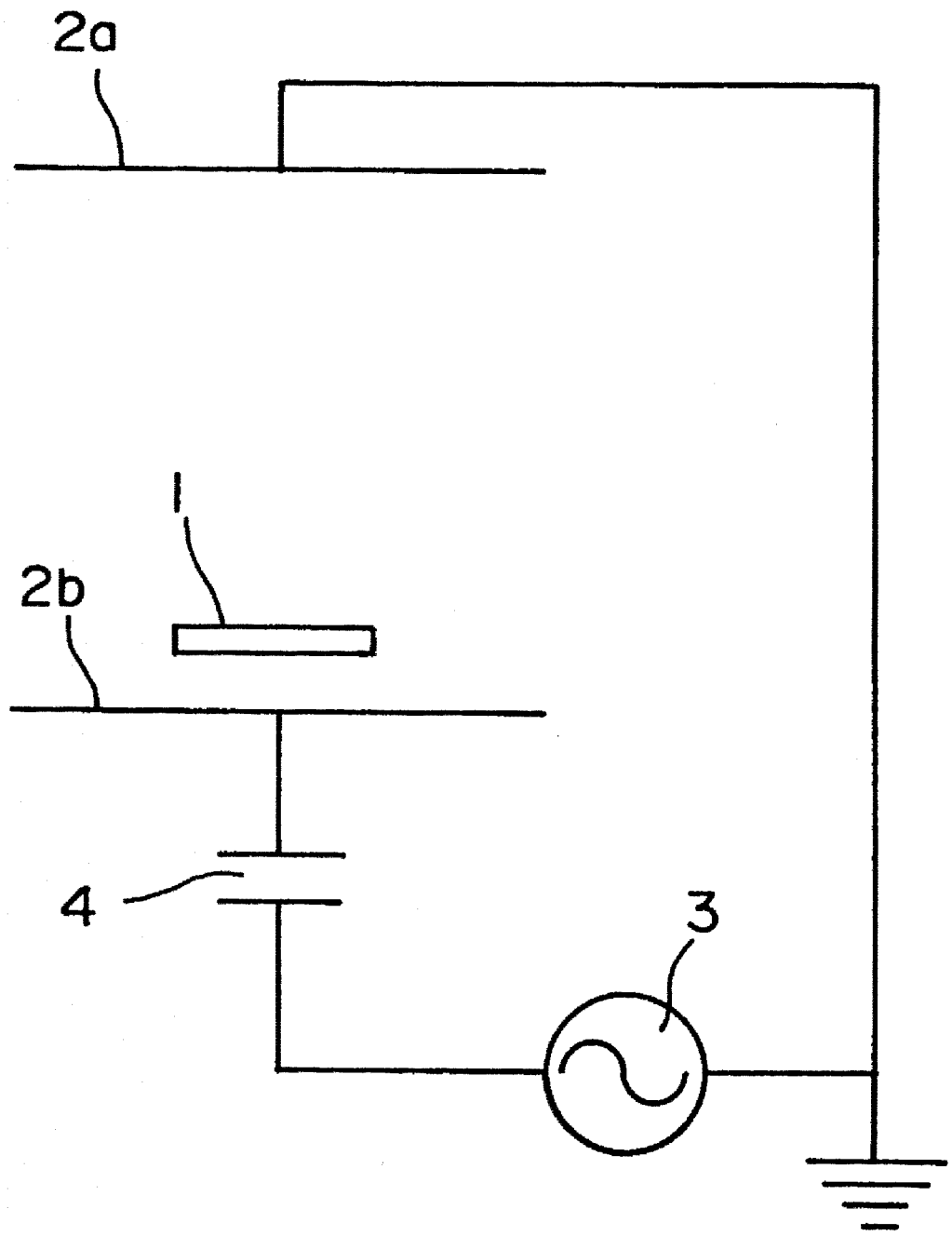
FIG. 2 is a schematic illustration of the arrangement of a substrate plate which is disposed in parallel to the electrode surface in an apparatus for reactive ion etching.

FIGS. 1 and 2, on the other hand, each schematically illustrate the similar wiring circuit diagram in a reactive ion etching chamber comprising a pair of oppositely facing electrodes 2a, 2b, one, directly grounded and, the other, grounded through a coupling capacitor 4 and a high-frequency electric power source 3. The reactive ion etching is a method in which the ions produced in the plasma between the electrodes are attracted toward the substrate plate therebetween by means of the accelerating potential difference to effect etching of the substrate surface. The reactive ion etching is generally preferred to the plasma etching because the time necessary for surface roughening is considerably shorter than in the latter method.

The etching gas, i.e. the gas filling the atmosphere between the electrodes in the plasma etching and reactive ion etching preferably contains a halogen compound and/or oxygen. For example, examples of the preferable etching gas is a gaseous mixture of sulfur hexafluoride and oxygen or a mixture of carbon tetrafluoride and oxygen. These gases can be introduced separately into the etching chamber each in a specified flow rate or can be introduced as a gaseous mixture in a specified mixing ratio. When the etching gas is a mixture of sulfur hexafluoride and oxygen, the volume fraction of the sulfur hexafluoride in the mixture is in the range from 10% to 90% or, preferably, from 20% to 70% or, more preferably, from 20% to 55%. When the etching gas is a mixture of carbon tetrafluoride and oxygen, the volume fraction of the carbon tetrafluoride in the mixture is in the range from 10% to 90% or, preferably, from 20% to 70% or, more preferably, from 20% to 50%. Gaseous mixtures of which the mixing ratio of the gases is outside of these ranges are less effective as an etching gas to effect surface roughening of the substrate surface.

In the apparatus of FIG. 2, a single silicon substrate 1 is placed between the electrodes 2a, 2b or in the vicinity of the lower electrode 2b in a parallel disposition to the electrode 2b while, in FIG. 1, a plural number of silicon substrate plates 1 are disposed in a substantially perpendicular disposition to the surface of the electrode 2b. In this latter arrangement of the substrate plates 1, a number of the substrates can be subjected to the surface roughening treatment at one time with good productivity as compared with the parallel disposition illustrated in FIG. 2. In the parallel disposition of FIG. 2, it is noted that the effect of surface roughening is more remarkable on the upper surface of the substrate 1 facing the directly grounded electrode 2a than on the surface facing the lower electrode 2b so that, when an identical roughening effect on both surfaces of the substrate 1 is desired, the etching treatment must be repeated twice, the second treatment being performed with the substrate after the first treatment turned upside-down. The perpendicular disposition of the substrate plates 1 illustrated in FIG. 1 is advantageous also in this regard, in particular, in the reactive ion etching, because the surface-roughening effect proceeds evenly on both surfaces of each of the substrate plates 1. The method for holding the substrate 1 perpendicularly to the electrode 2b is not particularly limitative. For example, the substrate 1 can be held standing in a groove provided on a ceramic stand or the center opening of an annular substrate plate can serve for the purpose of hanging the substrate.

The so-called zone texturing treatment is proposed in Japanese Patent Kokai No. 63-279425 and No. 01-98118 in which the surface-roughening treatment is effected only on the CSS zone to ensure good CSS characteristics leaving the rest of the surface unroughened in order to obtain a high recording density so as to meet the inherently inconsistent requirements for the improvement of the CSS characteristics and the increase in the recording density. The zone texturing in the plasma etching or reactive ion etching can be performed either by covering the recording zone of the substrate plate with a mask to protect the recording zone from etching or by depositing particulates on to the CSS zone alone as scattered from a source body placed in the vicinity of the CSS zone. In the magnetic recording medium in an annular form, the CSS zone is usually formed along the inner periphery or around the center opening and the recording zone surrounds the CSS zone so that the source body for particulate scattering can be placed in the center opening. The above mentioned mask or the scattering source body is preferably made from aluminum, an aluminum alloy or glass in a circular or annular form.

The roughness Rmax of the thus roughened surface of the substrate plate is preferably in the range from 5 nm to 100 nm or, more preferably, from 20 nm to 100 nm on the CSS zone. When the surface of a substrate plate is wholly surface-roughened including the recording zone, the roughness Rmax should not exceed 100 nm or, preferably, 50 nm in consideration of the adverse effect of a large surface roughness on the recording density in the recording zone. When the roughness on the CSS zone after the surface-roughening treatment is too small, no improvement can be obtained in the CSS characteristics while, when the roughness is too large on the recording zone, the flying height of the magnetic head cannot be small enough. The surface roughness of the substrate surface can be determined by using a conventional probe-type surface roughness tester.

Though undesirable, it is more or less unavoidable that the surface of the substrate plate after the surface-roughening treatment by plasma etching or reactive ion etching is contaminated by the deposition of the decomposition residues containing sulfur, fluorine and others as produced from the etching gas. If the underlayer, magnetic recording layer and the like are formed on such a contaminated surface, these coating layers may eventually be subject to subsequent corrosion by the contaminant elements in the lapse of time. In this regard, it is desirable that the substrate surface after the surface-roughening treatment is examined by the EPMA (electron-probe microanalyzer) method to ensure that the amounts of these contaminant elements each do not exceed the detection limit of the analytical method or, in other words, the contaminant elements cannot be detected by the EPMA method.

Alternatively to the above described plasma etching and reactive ion etching, the surface-roughening treatment of a silicon substrate surface can be performed by the so-called anisotropic etching by using an anisotropic etching solution as a type of the wet-process treatment. Needless to say, the etching treatment of the surface of a semiconductor silicon wafer by using an etching solution is a well established process and described in many publications. Since the most conventional etching solution for silicon is an aqueous acid mixture of hydrofluoric acid and nitric acid developed for mirror-finishing of the silicon wafer surface, the desired effect of surface roughening can never be obtained by using such an etching solution even by modifying the mixing proportion and concentration of the acids rather eventually to cause a trouble due to appearance of large undulations on the substrate surface.

The inventors accordingly have conducted extensive studies to discover an efficient method of wet-process treatment for surface roughening of silicon substrate for a magnetic recording medium arriving at a quite unexpected discovery that adequate surface roughening of a silicon surface by using an etching solution can be achieved when the etching solution is a so-called anisotropic etching solution provided that the concentration of the solution or other conditions are selected appropriately although the anisotropic etching treatment per se is a known procedure.

The anisotropic etching solution here implied is an etching solution with which the etching rate for silicon is relatively low but differs depending on the crystallographic orientation of the crystals of silicon. Examples of anisotropic etching solutions suitable for the purpose of surface roughening of the silicon substrate surface include aqueous solutions of alkaline compounds such as alkali metal hydroxides, e.g., sodium hydroxide and potassium hydroxide, hydrazine, ethylene diamine and quaternary ammonium hydroxides, of which alkali metal hydroxides, i.e. sodium hydroxide and/or potassium hydroxide, are preferred. The solvent to dissolve these alkaline compounds is water but it is optional to admix the water with a minor amount of an alcoholic solvent such as isopropyl alcohol, n-propyl alcohol, n-butyl alcohol and the like. The concentration of sodium hydroxide and/or potassium hydroxide in the anisotropic etching solution is in the range from 0.5 to 5.0% by weight. When the concentration is too high, large pyramidal depressions are formed on the surface of silicon having, for example, the (100) crystallographic orientation so that the thus roughened silicon surface is not suitable as a substrate of magnetic recording media while, when the concentration of the etching solution is too low, the distribution density of the surface protrusions to constitute the surface roughness cannot be high enough without a drawback that the height of the protrusions is too high if not to mention the unduly decreased velocity of the etching process. This method of anisotropic etching for surface roughening of a silicon substrate surface is of course applicable to zone texturing by providing a mask on the substrate surface to cover the area, e.g., recording zone, so as to protect the area from the attack of the etching solution.

In the following, examples are given to illustrate the present invention in more detail but the scope of the invention is never limited thereto in any way.

EXAMPLE 1.

Figure 4A:
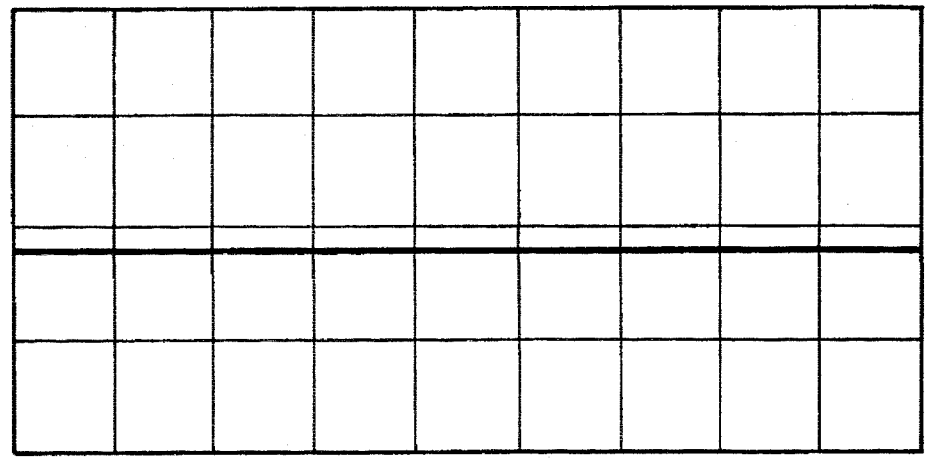
FIGS. 4a and 4b are each a record of the surface roughness measurement on a silicon substrate plate either before or after the reactive ion etching treatment, respectively, in Example 1. According to FIGS. 4a and 4b, the length of one square along the bottom of the diagrams (or the "x axis") is 0.2 mm and the height of each square (along the "y axis") is 20 mm.
Figure 4B:
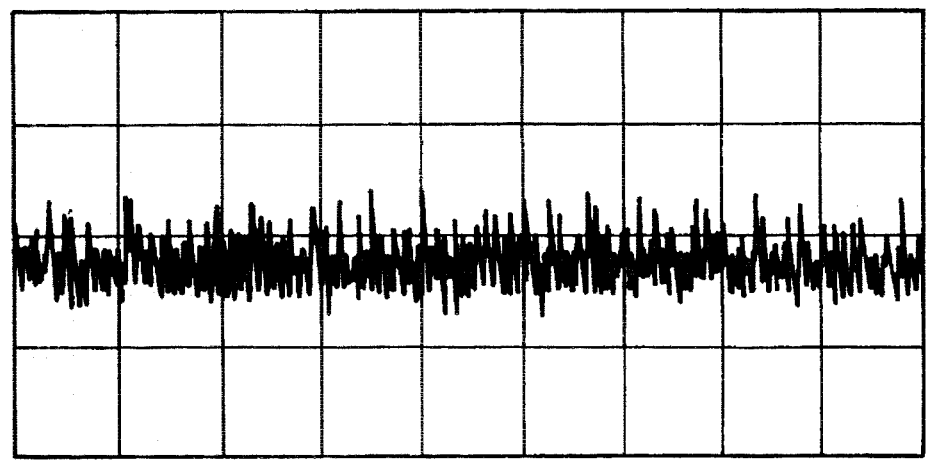

A semiconductor silicon wafer in an annular form having an outer diameter of 48 ram, inner diameter of 12 mm and thickness of 0.38 ram, of which the surface roughness Rmax was 3.1 nm as shown by the diagram of FIG. 4a, was set in an etching chamber of FIG. 2 in a disposition parallel to the lower electrode 2b. Reactive ion etching treatment of this substrate plate was performed for 15 minutes by filling the etching chamber with a gaseous mixture of sulfur hexafluoride and oxygen in a volume ratio of 4:5 under a pressure of 0.1 Torr and supplying 150 watts of RF power to the electrodes. The substrate plate after this etching treatment was taken out of the etching chamber and the surface roughness thereof was measured by using a probe-type surface roughness tester to find that the surface roughness Rmax was 26 nm on the surface facing the electrode 2a as is shown in FIG. 4b. Further, the thus treated silicon substrate was subjected to the EPMA analysis to examine surface contamination but no elements other than silicon could be detected.

EXAMPLE 2.

The experimental procedure was substantially the same as in Example 1 except that the etching gas filling the etching chamber was a 4:5 by volume mixture of carbon tetrafluoride and oxygen and a plural number of the annular silicon wafers were held each in a disposition perpendicular to the electrodes as is illustrated in FIG. 1. The condition of surface roughening was identical on both surfaces of each of the substrate plates and the surface roughness Rmax thus accomplished was 17 nm.

EXAMPLE 3.

The experimental procedure was substantially the same as in Example 1 except that an annular mask of aluminum having an outer diameter of 50 mm, inner diameter of 24 mm and thickness of 1 mm was concentrically mounted on the silicon substrate plate in direct contact therewith so that the reactive ion etching was effected only to the inner peripheral annular zone of 6 mm radial width, the other area being intact as being protected by the mask. The surface of the substrate plate after this zone texturing treatment had a roughness Rmax of 61 nm at a distance of 10 mm apart from the center and 3.3 nm at a distance of 21 mm apart from the center.

EXAMPLE 4.

The experimental procedure was substantially the same as in Example 1 except that a glass disc having a diameter of 12 mm and thickness of 0.6 mm was put into the center opening of the annular silicon substrate plate as a source body for scattering of particulates. The surface of the substrate plate after this zone texturing treatment by means of particulate scattering and deposition had a roughness Rmax of 55 nm at a distance of 10 mm apart from the center and 4.2 nm at a distance of 21 mm apart from the center.

EXAMPLE 5.

The silicon substrate plates after the surface roughening treatment in Examples 1 and 2 were each subjected to successive film formation by the RF sputtering method in an atmosphere of argon under a pressure of $3 \times 10^{-3}$ Torr while keeping the substrate surface at a temperature of 250° C. to form an underlayer of chromium in a thickness of 100 nm, magnetic recording layer of an alloy of cobalt, chromium and tantalum in a thickness of 60 nm and protecting layer of carbon in a thickness of 30 nm to complete a magnetic recording medium. After coating the surface with a lubricant, a CSS-mode magnetic head was brought into direct contact with the CSS zone of the magnetic recording medium and kept overnight as such.

Thereafter, the stiction on the magnetic head, i.e. the force required to initiate relative movement between the magnetic head and the recording medium, was measured by using a CSS tester with a strain gauge built therein to give a result that the stiction in each of these magnetic recording media was as small as a half or even smaller as compared with the value obtained with another magnetic recording medium prepared in the same manner as above but without the surface roughening treatment of the substrate surface.

EXAMPLE 6.

The experimental procedure was substantially the same as in Example 1 except that, in place of the reactive ion etching in Example 1, the surface roughening treatment of the silicon substrate plate was conducted by the plasma etching method as is illustrated in FIG. 3 and the treatment time was 30 minutes instead of 15 minutes. The surface roughness Rmax of the thus treated silicon substrate plate was 8.3 nm.

EXAMPLE 7.

The experimental procedure was substantially the same as in Example 1 except that the single crystal silicon wafer as the substrate plate was replaced with an annular disc of polycrystalline silicon having the same dimensions. The surface roughness Rmax of the thus treated silicon substrate plate was 21 nm within the crystalline grains.

EXAMPLE 8.

An annular wafer of semiconductor silicon having the same dimensions as in Example 1, of which the surface roughness Rmax was 3.2 nm, was subjected to anisotropic etching treatment by dipping in a 2% by weight aqueous solution of sodium hydroxide at 50° C. for so that the amount of etching was 1 μm. The surface roughness Rmax of the thus treated substrate plate was 20 nm.

EXAMPLE 9.

The experimental procedure was just the same as in Example 8 except that the etching solution of sodium hydroxide was replaced with an aqueous solution of potassium hydroxide in the same concentration by weight. The amount of etching was 1 μm. The surface roughness Rmax of the thus treated substrate plate was 30 nm.

EXAMPLE 10.

Magnetic recording media were prepared by using the surface-roughened silicon substrate plates prepared in Examples 8 and 9 in the same manner as in Example 5 and they were subjected to the CSS test also in the same manner as in Example 5. The results were as satisfactory as in Example 5.

What is claimed is:

1. In a method for the preparation of a magnetic recording medium, which comprises a substrate plate of silicon as a non-magnetic material and a magnetic recording layer of a magnetic metal or alloy formed on at least one surface of the substrate plate, in a process comprising the step of forming the magnetic recording layer by a dry process on the surface of the substrate plate, the improvement which comprises, prior to the formation of the magnetic recording layer on the surface of the substrate plate, subjecting the surface of the substrate plate to a surface roughening treatment so that the surface has a surface roughness Rmax in the range from 5 nm to 100 nm.

2. The improvement as claimed in claim 1 in which the surface-roughening treatment of the substrate surface is performed by the method of plasma etching or reactive ion etching in an atmosphere of an etching gas.

3. The improvement as claimed in claim 2 in which the etching gas is a mixture of sulfur hexafluoride and oxygen in a mixing ratio of 1:9 to 9:1 by volume or a mixture of carbon tetrafluoride and oxygen in a mixing ratio of 1:9 to 9:1 by volume.

4. The improvement as claimed in claim 2 in which the plasma etching or reactive ion etching is conducted in the presence of a particulate-scattering source body in the vicinity of the substrate plate to cause scattering and deposition of particulates on the surface of the substrate plate.

5. The improvement as claimed in claim 4 in which the particulate-scattering source body is made from aluminum, an aluminum alloy or glass.

6. The improvement as claimed in claim 1 in which the surface-roughening treatment of the substrate surface is performed by the method of anisotropic etching in an anisotropic etching solution.

7. The improvement as claimed in claim 6 in which the anisotropic etching solution is an aqueous solution of an alkaline compound.

8. The improvement as claimed in claim 7 in which the alkaline compound is sodium hydroxide or potassium hydroxide.

9. The improvement as claimed in claim 8 in which the concentration of the alkaline compound in the aqueous solution is in the range from 0.5 to 5.0% by weight.

* * * * *